April 29, 1952     A. C. STOCKER     2,594,513
LINEARITY CONTROL SWEEP CIRCUITS
Filed Nov. 20, 1950
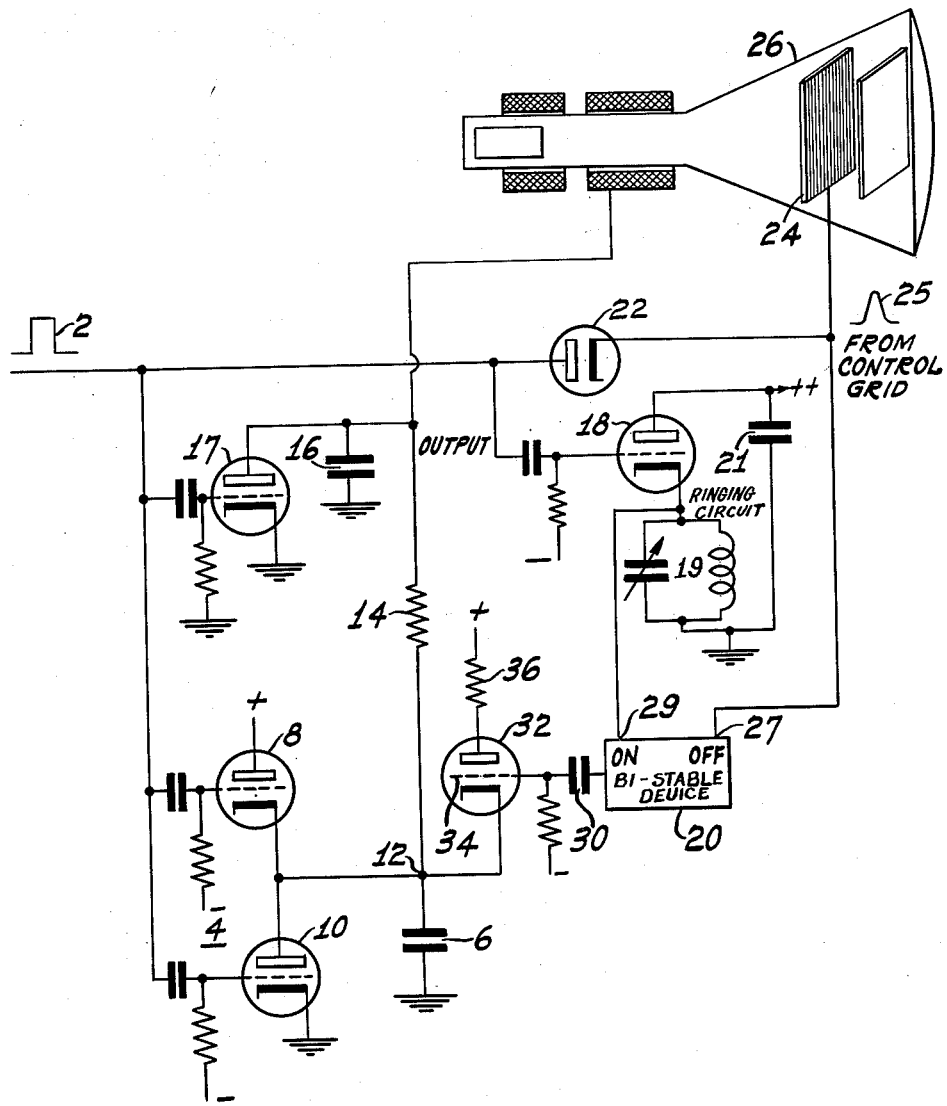
INVENTOR
*Arthur C. Stocker*
ATTORNEY Patented Apr. 29, 1952

2,594,513

UNITED STATES PATENT OFFICE 2,594,513

LINEARITY CONTROL SWEEP CIRCUITS

Arthur C. Stocker, Collingswood, N. J., assignor to Radio Corporation of America, a corporation of Delaware Application November 20, 1950, Serial No. 196,585

7 Claims. (Cl. 315—26)

This invention relates to apparatus for producing linear scanning of an electron beam. In particular, the circuit arrangements herein provided are capable of making corrections in the scanning with a minimum of time delay.

As is well known in the television art, the horizontal scanning of a cathode ray beam is not perfectly linear, deviations of 5% being common and deviations of 1% being considered excellent. To improve linearity, there has been suggested the introduction into the cathode ray tube of a grid having equally spaced vertical wires which generate a series of pulses as the beam scans across them. The frequency of these pulses is determined by the spacing of the wires and the scanning velocity or speed of traverse of the beam. Apparatus of this type is described in U. S. patent to Beers 2,385,563. In such systems, it is customary to pass the generated pulses through a frequency discriminator such as is used in FM receivers, thereby generating a D. C. voltage, the value of which is a measure of velocity of the beam's progress across the raster. The D. C. voltage thus derived is employed to introduce scanning correction.

It is an object of this invention to provide an improved means for deriving a scanning correction voltage for use in cathode ray tubes wherein the time delay present in the system is minimized.

It is a further object of the invention to provide a means whereby a direct current signal may be derived in accordance with the phase difference between two other signals.

Briefly, these objectives may be obtained by the following means: An auxiliary storage condenser is charged to a predetermined potential in response to the presence of the line synchronizing pulses. Between the line synchronizing pulses, however, the charge on this storage condenser is employed to charge another condenser across which the sweep voltage waveform is to be developed. The rate of shift of charge from the storage condenser to the sweep voltage condenser is controlled by an impedance, usually a resistor.

The use of one condenser to charge the other would normally produce a sawtooth waveform having less linearity than that normally obtained, for as the charge is transferred the voltage on the storage condenser would drop and reduce the rate of charge transfer. However, means are provided for simultaneously re-charging the storage condenser, the amount of recharge being controlled by the progress of the electron beam across the grid noted above. Control is effected by comparing the phase between the grid-produced pulses and pulses from a ringing circuit.

The way in which the above objectives may be carried out will be clearer after a detailed consideration of the drawing, which illustrates one embodiment of this invention in schematic form.

The line synchronizing pulses, such as indicated by the numeral 2 are applied to four different points in the circuit, one of which is a keyed clamp circuit, generally indicated by the numeral 4, which serves to charge a storage condenser 6 to a predetermined value. Although various forms of clamp circuits may be employed, the one illustrated is comprised of two tubes 8 and 10 connected in series between a source of positive potential and ground. The grid leak resistors are returned to sources of potential sufficiently negative to cut off the tubes 8 and 10. Upon application of a line synchronizing pulse 2 to the grids of the tubes 8 and 10, both of the amplifiers become conductive and the cathode of the tube 8 and the plate of the amplifier 10 both acquire a predetermined potential between ground and the positive voltage applied to the plate of the tube 8. This potential is applied across the storage condenser 6. Thus, during each of the line synchronizing pulses 2, the condenser 6 acquires a certain predetermined amount of charge, and therefore the junction 12 reaches a predetermined potential.

In accordance with present practice, the line synchronizing pulses 2 are also applied so as to discharge the condenser 16 across which the sweep waveform is to be generated. This is accomplished by applying these pulses to a normally cut off discharge tube 17 that is connected in parallel with the condenser 16. The sweep waveform appearing across the condenser 16 is applied in the customary manner to the horizontal coils of a deflection yoke 16'.

An impedance, which may be a resistor 14, is connected between the top plates of condensers 6 and 16 so as to form a closed loop. Therefore, immediately following the charging of the condenser 6, it begins to share its charge with the condenser 16, thus making the top plate of the condenser 16 more positive. The rate of charge transfer is determined by the resistor 14 and the voltages on the two condensers.

Thus during each of the line synchronizing pulses 2 the condenser 6 receives a predetermined amount of charge and the condenser 16 is discharged. In between the line synchronizing pulses 2, the condenser 6 charges the condenser 16.

The line synchronizing pulses 2 are also coupled so as to render conductive a normally cut off tube 18 whose cathode circuit includes a ringing circuit 19. During the presence of the line synchronizing pulses 2, the oscillations in the ringing circuit 19 are damped out due to the loading action of the amplifier 18 which is placed effectively in parallel with this circuit by a decoupling condenser 21 such as is normally employed to prevent A. C. energy from getting into a power supply. The voltage appearing across this ringing circuit is applied to one terminal 29 of a bistable circuit 20. An Eccles Jordan type multivibrator may be employed as the bistable circuit 20.

The line synchronizing pulses 2 are also applied to another terminal 27 of the bistable circuit 20 via a unilateral device such as a diode 22. The cathode of the diode 22 is connected to a source of pulses derived as the beam scans across a grid structure 24 in a cathode ray tube 26. Because the vertical grid wires of the grid 24 are uniformly spaced, the pulses 25 generated as the cathode ray beam intersects each grid wire are indicative of the horizontal position of the beam on the raster. The pulses 25 are also connected to the terminal 27 of the bistable circuit 20.

An amplifier 32 is connected between a source of positive potential and the junction 12 of the condenser 6. Its grid 34 is returned to a sufficiently negative potential to cut the tube off in the presence of a negative pulse on the lead 30 that is coupled to the output of the bistable circuit 20.

The overall operation of the circuit arrangement described in detail above is as follows. When a sync pulse 2 is received, the tubes 8, 10, and 17 all conduct, discharging the condenser 16 and establishing a predetermined potential on the condenser 6 as previously explained. At the same time the ringing circuit 19 is prevented from oscillating and a magnetic field of predetermined strength is established around the inductance of the ringing circuit 19. The pulses 2 are also applied to the terminal 27 of the bistable circuit 20, thereby causing a negative pulse to appear in the output lead 30 and thus prevent the tube 32 from placing additional charge on the condenser 6.

After the passage of the sync pulse, the voltage on the condenser 16 begins to rise at approximately the correct rate due to charge received from the condenser 6, as previously explained, and the electron beam starts across the raster at approximately the correct speed. With the unblanking of the ring circuit 19, the circuit starts to ring and the correcting action begins. After approximately one cycle of the ringing frequency, the ringing circuit causes the bistable circuit 20 to permit the amplifier 32 to conduct and pass charge into the condenser 6 at a rate limited by the resistor 36. Shortly thereafter, if the beam is traveling at the proper speed, a pulse from the grid 24 that lies within the cathode ray tube 26 causes the bistable circuit 20 to stop the charging of the condenser 6 through the tube 32. By adjusting the current passed by the tube 32, the voltage on the condenser 6 may be made to rise at a sufficient rate to produce a linear sawtooth across the condenser 16.

Now if the progress of the electron beam is slower than desired, the pulses from the grid 24 arrive at the bistable circuit 20 later than normally. This permits the tube 32 to conduct for a greater period of time than normal and to place a larger additional charge on the condenser 6. Thus the rate of rise of the voltage across the condenser 16 is increased and the beam, which is deflected in accordance with voltage across the condenser 16, is sped up.

On the other hand, if an electron beam is traveling too fast, the pulse from the grid 24 arrives earlier than normal. The tube 32 therefore conducts for a shorter time than normal and adds less charge to the condenser 6. The voltage on the condenser 6 therefore remains about the same, or due to the charge current drawn from it through the resistor 14 and the condenser 16, it may decrease somewhat. As long as the beam is scanning too rapidly, this action continues until the conducting time of the tube 32 approaches zero, in which condition the voltage on the condenser 6 drops, due to the current taken by the resistor 14 and the condenser 16 and the beam slows down.

The scanning rate starts near normal, but if there is no correcting action the discharge of condenser 6 soon makes it run slow. So no matter what the original phase, the grid pulse soon finds the proper phase to give the needed correction.

In any embodiment of my invention, it is apparent that a proper scanning speed of the electron beam should result in the tube 32 placing a certain additional charge on the condenser 6, and departures from this proper speed should cause the tube 32 to conduct for either a greater fraction of time or for a smaller fraction of time, whichever is required to restore the proper speed.

Having thus described my invention, what is claimed is:

1. Apparatus for deriving a scanning voltage for scanning a beam of electrons in linear fashion comprising the combination of a first condenser across which said scanning voltage is to be developed, a resistor and a second condenser being connected in series with said first condenser so as to form a closed loop, means for discharging said first condenser in response to each of a series of pulses, means for establishing a predetermined amount of charge on said second condenser in response to each of said pulses, and means for charging said second condenser between said pulses by an additional amount dependent on the phase relationship of two signals.

2. Apparatus as described in claim 1 wherein said second named means for charging said second condenser is comprised of a switch, said switch being connected in series with a current limiting impedance and a source of fixed potential and said second condenser, means for closing said switch in response to one of said signals and for opening said switch in response to the other of said signals.

3. Apparatus for correcting the change in scanning energy in a scanning system employed in a cathode ray tube comprising in combination, means for deriving a series of pulses spaced in time with respect to the position of the cathode ray beam as it scans across a line of the raster, a ringing circuit adapted to be energized in a given polarity in response to synchronizing pulses, a bistable circuit, a switch connected in series between a source of fixed potential, a current limiting impedance, and an energy storage condenser, said switch being closed so as to permit said condenser to be charged by said potential when said bistable circuit is in a first position, said switch being opened when said bistable circuit is in a second position, said bistable circuit having first and second terminals, one of said terminals being adapted to cause said bistable circuit to assume said first position in response to a voltage of a given polarity, the other of said terminals being adapted to cause said bistable circuit to assume said second position in response to voltages of said given polarity, the voltage appearing across said ringing circuit being applied to said first terminal and said pulses being applied to said second terminal, a charging condenser and a resistor connected in series with said storage condenser so as to form a closed loop, means for discharging said charging condenser in response to said synchronizing pulses, and a keyed clamping circuit adapted to charge said storage condenser to a predetermined potential in response to said synchronizing pulses.

4. Apparatus for deriving a sweep voltage that is adapted to scan a beam of electrons in linear fashion comprising in combination a first condenser across which said sweep voltage is to be developed, an impedance and a second condenser connected in series with said first condenser so as to form a closed loop, means for discharging said first condenser in response to each of a series of pulses, means for establishing a predetermined amount of charge on said second condenser in response to each of said pulses, means for deriving signals as the cathode ray beam crosses uniformly separated points on the raster, means for initiating oscillations in response to each of said pulses, and means for altering the charge on said second condenser in accordance with the phase difference between said oscillations and said signals.

5. Apparatus for deriving a linear sweep voltage wave comprising in combination a source of uniformly spaced pulses, a first condenser across which the sweep voltage wave is to be developed, means for discharging said first condenser in response to and during each of said pulses, a second condenser, means for charging said second condenser by a predetermined amount in response to each of said pulses, said second condenser and a resistor being connected in series so as to form a closed loop whereby any charge on said second condenser flows through said resistor to said first condenser, a cathode ray tube having an electron gun for forming a beam of electrons, a target mounted so as to intercept said beam of electrons, a grid of parallel conductors mounted between said gun and said target, a beam deflection means, said deflection means being coupled so as to be actuated by the voltage across said first condenser, said beam deflection means being oriented so as to deflect said beam across the conductors of said grid, a ringing circuit, an electron discharge device coupled in series with said ringing circuit, means for biasing said electron discharge device to cut-off, means for coupling the pulses to said electron discharge device so as to render it conductive only during the presence of the pulses and thus to store a predetermined amount of energy in said ringing circuit, said ringing circuit being tuned to the frequency at which the beam crosses the conductors of said grid, a source of fixed potential, a second electron discharge device coupled with said source of fixed potential and said second condenser so as to form another closed loop, means for biasing said electron discharge device to cut-off, a bistable device, means for triggering said bistable device into a first stable condition in response to a crest of the oscillations appearing across said ringing circuit, means for triggering said bistable device to a second stable condition in response to signals generated when the electron beam crosses each of said grid wires, and means for coupling said second electron discharge device to a point on said bistable device such that said second electron discharge device is rendered conductive only when said bistable device is in its first stable condition.

6. Apparatus for deriving a sweep voltage that is adapted to scan a beam of electrons in linear fashion comprising in combination a first condenser across which said sweep voltage is to be developed, an impedance and a second condenser connected in series with said first condenser so as to form a closed loop, means for discharging said first condenser in response to each of a series of pulses, means for establishing a predetermined amount of charge on said second condenser in response to each of said pulses, a grid mounted so as to intercept said beam of electrons, said grid being comprised of conducting members, a ringing circuit, means for shocking said ringing circuit into oscillation in response to each of said pulses, said ringing circuit having a resonant frequency that is the same as the frequency of the signals produced as the electron beam scans across said grid at the desired rate, means for charging said second condenser, said charging means being normally inactive, and means for activating said charging means for a time between adjacent crests of the oscillation and the signals that are respectively produced by said ringing circuit and said grid.

7. Apparatus as described in claim 6 wherein said means for activating the means for charging the second condenser is a bistable multivibrator that is coupled to said ringing circuit so as to be triggered into a first stable state by oscillations appearing therein and is coupled to said grid so as to be triggered to a second stable state, said multivibrator being coupled to said charging means so as to render it active only when said multivibrator is in its first stable state.

ARTHUR C. STOCKER.

REFERENCES CITED

The following references are of record in the file of this patent:

UNITED STATES PATENTS

| Number | Name | Date |
| --- | --- | --- |
| 2,147,559 | Schlesinger | Feb. 14, 1939 |
| 2,383,333 | Milward | Aug. 21, 1945 |
| 2,385,563 | Beers | Sept. 25, 1945 |
| 2,455,321 | Stolze et al. | Nov. 30, 1948 |
| 2,552,884 | Cannon | May 15, 1951 |
| 2,559,492 | Bedford | July 3, 1951 |